United States Patent [19]

Ruttenberg et al.

[11] Patent Number: 4,548,551
[45] Date of Patent: Oct. 22, 1985

[54] FLUID DRIVEN RECIPROCATING PUMP CAPABLE OF EITHER SINGLE-ACTION OR DOUBLE-ACTION OPERATION

[75] Inventors: Alexander Ruttenberg, Haifa; Alexander Zur, Kfar Bialik, both of Israel

[73] Assignee: T.M.B. Fertilizer Pumps Ltd., Haifa, Israel

[21] Appl. No.: 607,157

[22] Filed: May 4, 1984

[30] Foreign Application Priority Data

May 10, 1983 [IL] Israel .................................. 68647

[51] Int. Cl.⁴ .............................................. F04B 9/10
[52] U.S. Cl. ........................................ 417/393; 91/309
[58] Field of Search ............... 417/393, 395, 403, 404, 417/397; 91/304, 309

[56] References Cited

U.S. PATENT DOCUMENTS

| | | | |
|---|---|---|---|
| 1,935,792 | 11/1933 | Farmer | 91/309 X |
| 2,236,665 | 4/1941 | Beers | 91/309 X |
| 3,162,093 | 12/1964 | Zoller | 91/309 X |
| 3,838,946 | 10/1974 | Schall | 417/395 |
| 4,021,149 | 5/1977 | Rutenberg et al. | 417/395 |

FOREIGN PATENT DOCUMENTS

| | | | |
|---|---|---|---|
| 1177707 | 4/1959 | France | 417/395 |
| 370842 | 4/1932 | United Kingdom | 417/395 |
| 831383 | 3/1960 | United Kingdom | 417/393 |

Primary Examiner—Leonard E. Smith
Attorney, Agent, or Firm—Benjamin J. Barish

[57] ABSTRACT

A fluid-driven reciprocating pump comprises a pair of pumping heads each containing a displaceable member defining a driving chamber and a pumping chamber, a mechanical connection coupling the two displaceable members for reciprocation together, and means for connecting the driving chamber of one pumping head to a source of pressurized fluid and the pumping chamber of that pumping head to a source of material to be pumped. The pump further includes means for connecting the driving chamber of the other pumping head to a source of pressurized fluid and for selectively connecting the pumping chamber of the other pumping head either to a source of material to be pumped to produce a double-action pumping operation wherein the material is pumped during both reciprocations of the displaceable members, or to the source of pressurized fluid to produce a single-action pumping operation wherein the material is pumped during only one of the two reciprocations of the displaceable members.

17 Claims, 7 Drawing Figures

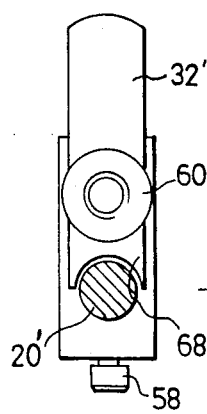
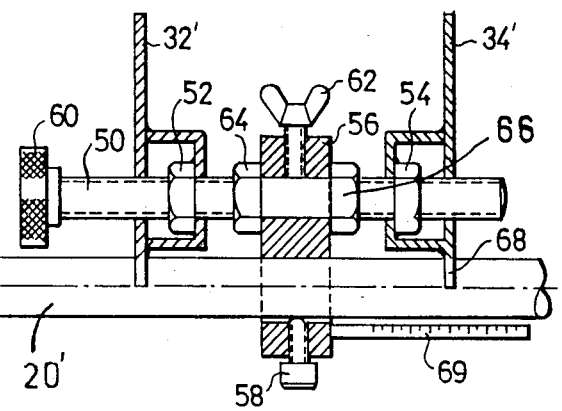
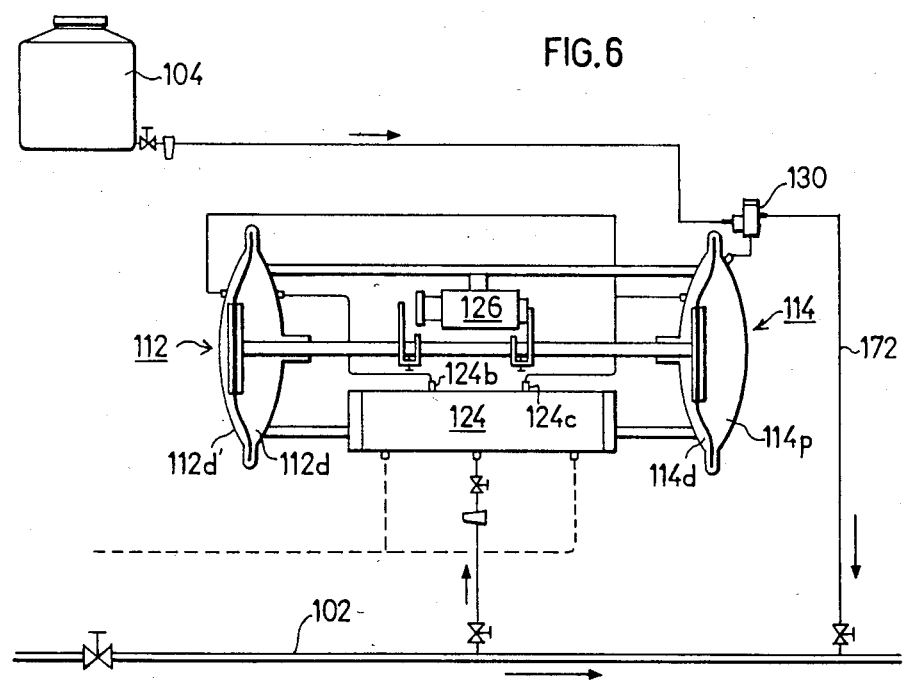

FLUID DRIVEN RECIPROCATING PUMP CAPABLE OF EITHER SINGLE-ACTION OR DOUBLE-ACTION OPERATION

BACKGROUND OF THE INVENTION

The present invention relates to fluid-driven reciprocating pumps. The invention is particularly applicable to the reciprocating pump illustrated in our U.S. Pat. No. 4,021,149 for use in injecting fertilizer into a water supply line, and is therefore described below with respect to this application.

The pump illustrated in the above-cited Patent has limited injection capacity, and moreover, can inject only one fertilizer solution. There are many applications requiring a larger injection capacity than capable of being attained by the pump of that Patent, and other applications requiring the injection of two different fertilizer solutions that cannot be mixed in one tank because they tend to precipitate but rather can be mixed only when injected into the water supply line where the precipitation problem is not present because of dilution by the water in the supply line.

SUMMARY OF THE INVENTION

An object of the present invention is to provide an improved fluid-driven reciprocating pump having advantages in the above respects.

According to one broad aspect of the invention, there is provided a fluid-driven reciprocating pump comprising a pair of pumping heads each containing a displaceable member defining a driving chamber and a pumping chamber on opposite sides thereof; a mechanical connection coupling the two displaceable members for reciprocation together; means including a main valve and a pilot valve for connecting the driving chamber of one of the pumping heads to a source of pressurized fluid and the pumping chamber of the one pumping head to a source of material to be pumped; and means including the mentioned main valve and pilot valve for connecting the driving chamber of the other pumping head to a source of pressurized fluid.

The main valve includes a cylinder, a stem movable in the cylinder, a pair of pistons fixed to the movable stem, a plurality of ports controlled by the pistons, and a diaphragm connected to one end of the stem and closing one end of the cylinder to define a fluid controlled chamber therein. The pilot valve includes a stem reciprocable by the mechanical connection coupling the two displaceable members for reciprocation together such that in one position of the two displaceable members the pilot valve applies the source of pressurized fluid to the control chamber of the main valve to move the main valve stem in one direction to connect the driving chamber of one pumping head to the source of pressurized fluid, whereas in the opposite position of the two displaceable members the pilot valve interrupts the application of the source of pressurized fluid to the control chamber of the main valve. One of the pistons in the main valve has a larger cross-sectional area exposed to the source of pressurized fluid than the other piston of the main valve. The arrangement is such that the larger cross-sectional area piston moves the main valve stem in the opposite direction, to connect the driving chamber of the other pumping head to the source of pressurized fluid, when the pilot valve interrupts the application of the pressurized fluid to the control chamber of the main valve.

The other pumping head may be connected either to a source of material to be pumped to produce a double-action pumping operation wherein the material is pumped during both reciprocations of the displaceable member connected either to a source of material to be pumped to produce a double-action pumping operation wherein the material is pumped during both reciprocations of the displaceable members, or to the source of pressurized fluid to produce a single-action pumping operation wherein the material is pumped during only one of the two reciprocations of the displaceable members.

In the described preferred embodiment, the displaceable members are diaphragms and are coupled for reciprocation together by a connecting rod. In addition, the source of pressurized fluid is a liquid supply line, and the outlets of the pumping chambers of the two pumping heads are connected to the liquid supply line downstream of the reciprocating pump for injecting the material into the supply line.

According to further features of the invention, the liquid supply line includes a reducing valve between the inlet to the reciprocating pump and the outlet thereof to the supply line; it may also include an externally-powered booster pump for boosting the pressure of the liquid from the supply line before applied to the driving chambers of the two pumping heads.

According to still further features of the invention, the pump further includes a presettable regulating valve between the supply line and the driving chamber of the two pumping heads for presetting the period of each reciprocating stroke; and a presettable member on the connecting rod between the two diaphragms for presetting the magnitude of each reciprocating stroke.

Further features and advantages of the invention will be apparent from the description below.

BRIEF DESCRIPTION OF THE DRAWINGS

The invention is herein described, by way of example only, with reference to the accompanying drawings, wherein:

FIG. 4 is a longitudinal sectional view illustrating an arrangement for presetting the magnitude of each stroke;

FIG. 5 is an end view of FIG. 4; and

FIG. 6 illustrates the pump of FIG. 1 connected for single-action operation.

DESCRIPTION OF PREFERRED EMBODIMENTS

Figure 1:
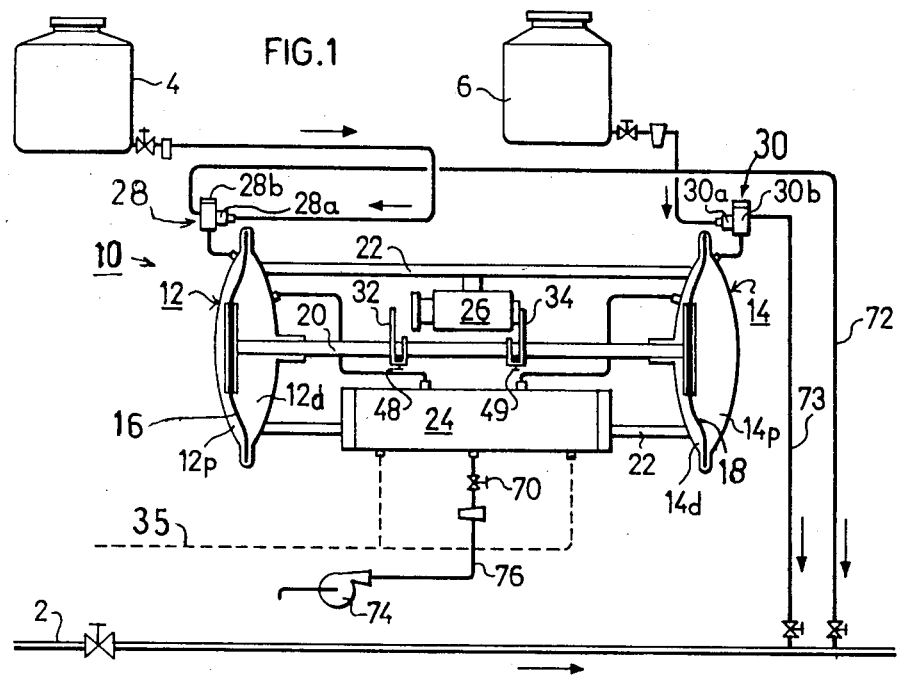
FIG. 1 schematically illustrates one form of fluid-driven reciprocating pump constructed in accordance with the present invention.

The reciprocating pump illustrated in FIG. 1 of the drawings is particularly for use in a water irrigation system, wherein it is driven by the pressurized liquid from the supply line 2 to pump fertilizer solution from tanks 4 and 6 into the supply line. As shown in FIG. 1, the pump, generally designated 10, includes two pumping heads 12 and 14 each provided with a displaceable member in the form of a diaphragm 16, 18 mechanically coupled for reciprocation together by a connecting rod 20. The two pumping heads are mechanically secured together by a plurality of tie rods 22, which tie rods also mount a main or distributing valve 24, and a pilot valve 26.

Diaphragm 16 in pumping head 12 divides the latter into a driving chamber 12d connectible via the main valve 24 to the supply line 2, and a pumping chamber 12p connectible via a suction/delivery valve assembly 28 to the source of fertilizer solution 4; similarly, diaphragm 18 of pumping head 14 divides that head into a driving chamber 14d connectible via main valve 24 to the supply line 2, and a pumping chamber 14p connectible via a suction/delivery valve assembly 30 to fertilizer tank 6.

The reciprocations of the two diaphragms 16, 18 are cyclically controlled by a pair of actuator elements 32, 34 carried by connecting rod 20 and cooperable with pilot valve 26, which pilot valve in turn controls the main valve 24 controlling the connections of the driving chambers 12d, 14d to the pressurized water supply line 2.

Figure 2:
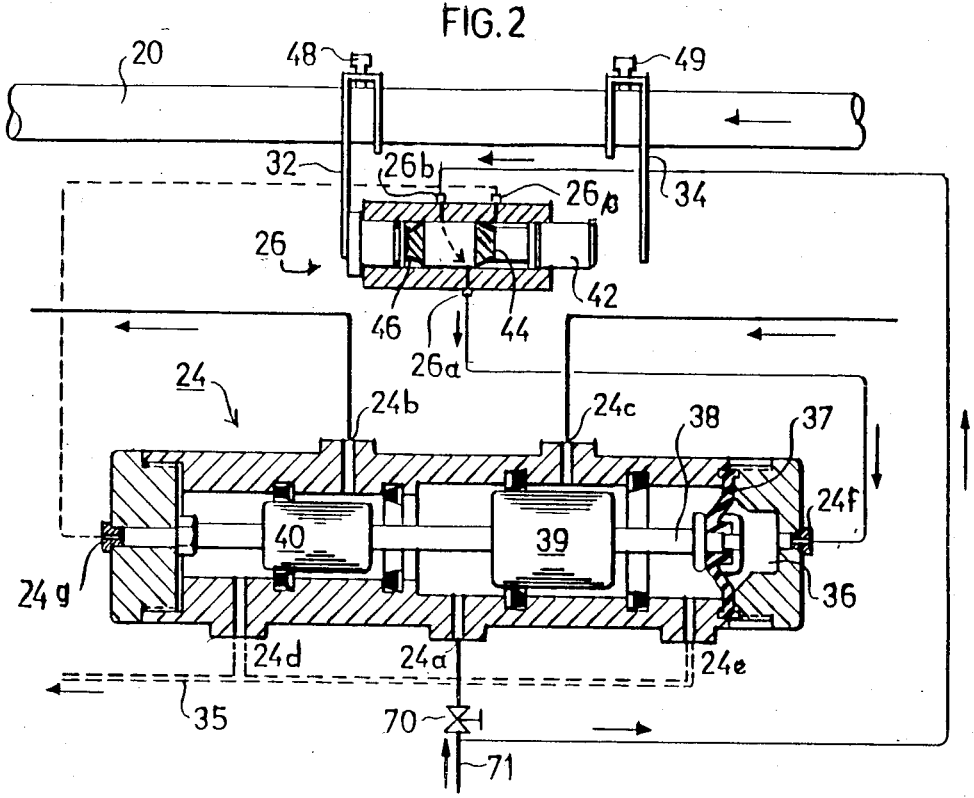
FIGS. 2 and 3 illustrated the conditions of the pilot valve and the main valve, in the pump of FIG. 1, at two different times during a cycle of operation.
Figure 3:
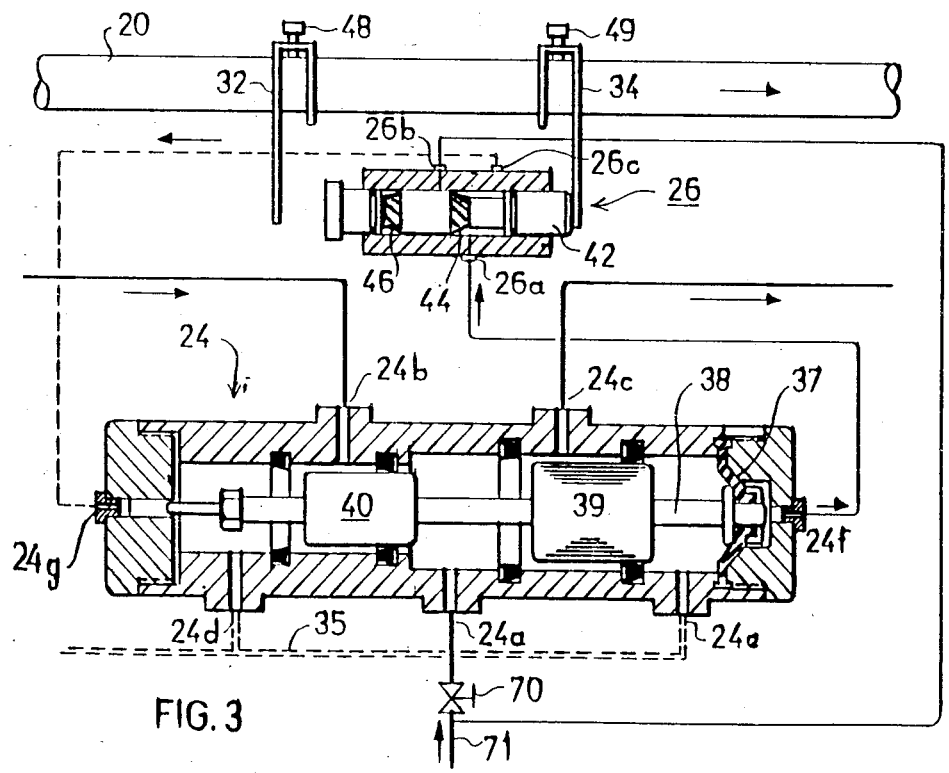

The structure of the main valve 24 and the pilot valve 26 are illustrated in FIGS. 2 and 3, FIG. 2 illustrating the condition of these valves at the beginning of the leftward stroke, and FIG. 3 illustrating their condition at the beginning of the rightward stroke.

Main valve 24 is a 5-way valve including 5 ports, namely: port 24a connected to the supply line 2, ports 24b and 24c connected to the driving chambers 12d, 14d, respectively; and ports 24d and 24e connected to a drain 35. Main valve 24 includes two further control ports 24f and 24g connected to the pilot valve 26. Port 24f leads into a chamber 36 at one end of the main valve defined by a diaphragm 37; and port 24g always communicates with drain port 24d at the end of the main valve opposite to chamber 36.

Diaphragm 37 reciprocates a stem 38 carrying a pair of pistons 39 and 40. Piston 39 is of larger diameter and is movable during the reciprocations of stem 38, to the leftmost position illustrated in FIG. 2 wherein it connects drive chamber 14d of pumping head 14 to drain 35 via port 24c, 24e; or to the rightmost position illustrated in FIG. 3 wherein it connects drive chamber 14d to the supply line 2 via ports 24c, 24a. Piston 40 is reciprocated by stem 38 between its two extreme positions, namely the leftmost position illustrated in FIG. 2 wherein it connects driving chamber 12d of pumping head 12 to the supply line 2 via ports 24a, 24b, or to the rightmost position illustrated in FIG. 3 wherein it connects driving chamber 12d to drain 35 via ports 24b, 24d.

The reciprocation of pistons 39, 40 in the main valve 24 are controlled by the pilot valve 26, which in turn is controlled by the actuator elements 32, 34 carried by connecting rod 20 between the two diaphragms 16, 18 of the two pumping heads 12, 14. Thus, pilot valve 26 includes a first port 26a connected to port 24f leading to chamber 36 of the main valve 24, a second port 26b connected to the supply line 2, and a third port 26c connected to port 24g of the main valve 24 leading to drain 35 via its port 24d.

The actuator elements 32, 34 carried by connecting rod 20, which control the pilot valve 26, are engageable with a stem 42 reciprocatable with the pilot valve and carrying a pair of pistons 44, 46. Thus, at the rightmost position of the connecting rod 20 (FIG. 2), stem 42 is in its rightmost position wherein its piston 44 connects the pressurized inlet port 26b to the outlet port 26a, thereby applying the pressurized water to chamber 36 of the main valve 24; and when the stem 42 is moved to its leftmost position by actuator element 34 carried by connecting rod (FIG. 3), this connection of chamber 36 to the supply line is interrupted, and instead, chamber 36 of the main supply valve 24 is connected to the drain via ports 26a and 26c of the pilot valve 26 and ports 24g and 24d of the main valve.

It will thus be seen that the position of the actuator elements 32, 34 determines the magnitudes of the reciprocating strokes. These elements may be presettably mounted on the connecting rod 20 by threaded clamps 48, 49 as illustrated in FIGS. 1–3, which are individually adjustable along the length of connecting rod 20.

FIGS. 4 and 5 illustrate an improved arrangement for presetting the actuator elements, therein designated 32', 34', on connecting rod 20'. Thus, both of the actuator elements 32', 34' are mounted on a rod 50 formed with a right-hand thread on its left side cooperable with a right-hand nut 52 carried by element 32', and with a right-hand thread on its right side cooperable with a right-hand nut 54 carried by element 34'. Rod 50 is carried by a mounting bracket 56 mountable to connecting rod 20' by a threaded pin 58. One end of threaded rod 50 carries a knob 60 which may be used for rotating the rod to move elements 32', 34' either closer together or further apart, the rod being fixed in its preset position by thumb-screw 62. Nuts 64, 66 on opposite sides of bracket 56 are used for locating purposes, and are also formed with right-hand and left-hand threads, respectively.

The lower ends of the actuator elements 32', 34' are formed with semi-circular extensions, as shown at 68 in FIGS. 4 and 5, conforming to the curvature of the connecting rod 20'; these extensions thereby guide the actuator element 32', 34' during the rotation of rod 50 by its knob 60. Preferably, bracket 56 includes graduation markings, as shown at 69 in FIG. 4, cooperable with extension 68 of one of the actuator elements(34' in this case), to indicate the preset position of the actuator elements, and thereby the magnitude of the reciprocating strokes.

The period of the reciprocating strokes may be preset by a regulating valve 70 interposed between the input line 71 and the input port 24a of the main valve 24. Thus, by throttling regulating valve 70, the rate of flow of the pressurized water from the supply line to port 24a of the main valve 24 will be reduced, thereby requiring a longer period for each operating cycle of the pump. The hourly capacity of the pump can therefore be preset by regulating valve 70, and the volume of each stroke can be preset by presetting the positions of actuator elements 32, 34 on connecting rod 20 to fix the magnitude of each stroke.

The suction/delivery valve assemblies 28, 30 control the flow of the fertilizer solution from the tanks 4, 6 to the pumping chambers 12p, 14p of the two pumping heads 12, 14 and also the flow of the fertilizer from these chambers to the delivery lines 72, 73 for injection into the water supply downstream of the pump. These valve assemblies may be of the same construction as illustrated in the above-cited patent. Briefly, each includes a suction one-way valve 28a, 30a which, during the suction stroke, permits the fertilizer solution to be drawn into the pumping chamber of the respective pumping head, but which, during the injection stroke, prevents the fertilizer from returning from the pumping head back to the fertilizer solution source. In addition, each suction/delivery valve assembly 28, 30 includes a one-way delivery valve 28b, 30b which, during the injection stroke, permits the fertilizer solution within the pumping chambers to pass to the delivery line 72, but during the suction stroke prevents a reverse flow of the fertilizer solution from the delivery line. These delivery valves 28b, 30b are also equipped with a blocking device which prevents the draining of fertilizer from the tanks 4,6 to the supply line by gravity in the event of a loss or drop of pressure in the water supply line. Suction/delivery valve assemblies 28, 30 may be as illustrated in the above-cited patent, and therefore details of their construction and operation are not deemed necessary here.

Figure 1A:
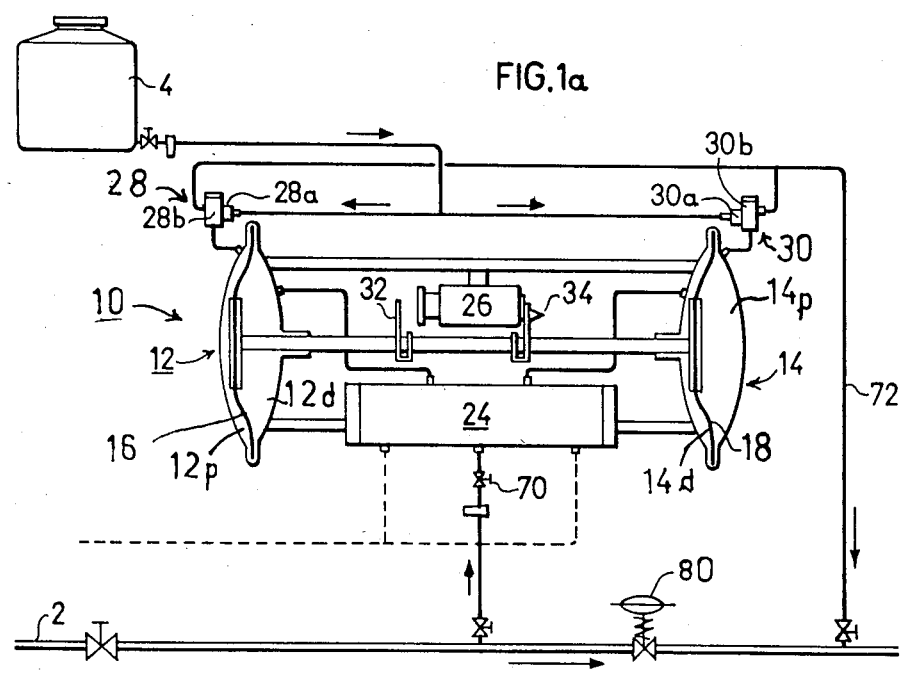
FIG. 1a illustrates a variation of the pump of FIG. 1.

As indicated earlier, the fertilizer pump illustrated in FIG. 1 may be connected for either a double-action pumping operation wherein the fertilizer is pumped during both reciprocation of the pumping heads, or for a single-action pumping operation wherein the fertilizer is pumped only during one of the two reciprocations of the pumping heads. FIG. 1 illustrates the reciprocating pump connected to produce the double-action pumping operation, thereby substantially increasing the injection capacity and also permitting the pump to inject fertilizer solutions from two different sources (tanks 4 and 6) which may be desirable where the particular properties of the solutions (e.g., tendency to precipitate) prevent them from being mixed together before injection into the water supply line. FIG. 1a illustrates the pump of FIG. 1 connected to pump fertilizer from a single tank (4); and FIG. 6 illustrates the pump connected to produce a single-action pumping operation.

When the pump is connected to produce a double-action pumping operation, there should be a certain difference between the pressure inletted to the pump from the supply line 2, and the pressure of the supply line at this point of injection of the fertilizer solution downstream of the pump. FIG. 1 illustrates producing this pressure differential by providing an external booster pump 74 between the supply line 2 and the pump inlet 76. Booster pump 74 may include a conventional drive, e.g. electrical or mechanical.

The pump illustrated in FIGS. 1–5 operate as follows:

Assuming that the pump has completed its rightward stroke, it will be seen that the various elements will be in the condition illustrated in FIG. 2, wherein stem 42 of the pilot valve 26 is in its rightmost position (having been moved there by actuator 32), so that the pressurized liquid of the supply line 2 is applied to chamber 36 of the main valve 24 via ports 26b and 26a of the pilot valve 26. This causes stem 38 of the main valve 24 to move leftwardly, whereupon the pressurized liquid from the supply line 2 is applied to driving chamber 12d of pumping head 12 via ports 24a, 24b of the main valve 24, whereas driving chamber 14d of pumping head 14 is connected to the drain 35 via ports 24c and 24e of the main valve. Accordingly, diaphragm 16 of pumping head 12 will be driven leftwardly carrying with it diaphragm 18 of pumping head 14 via the connecting rod 20. During this stroke, the fertilizer solution in pumping chamber 12p of pumping head 12 is fed via suction/delivery valve assembly 28 to feed line 72; whereas in pumping head 14, pumping chamber 14p is expanded to draw into it fertilizer from tank 6 via the suction/delivery valve assembly 30.

At the end of the leftward stroke, actuator element 34 engages stem 42 of pilot valve 26, moving it to the position shown in FIG. 3. whereupon chamber 36 of the main valve 24 is no longer pressurized by the supply line via inlet 71 and ports 26b, 26a of the pilot valve 26, but rather chamber 36 is connected to drain 35 via ports 26a, 26c of pilot valve 26, and ports 24g, 24d of the main valve 24. In addition, the pressure of the supply line is applied via port 24a of main valve 24 to the confronting faces of the two pistons 39, 40. However, since piston 39 has a larger cross-sectional area, it applies a greater force to stem 38, thereby moving the stem to its rightmost position as illustrated in FIG. 3. When this occurs, the pressure of the supply line is applied, via ports 24a, 24c, to the driving chamber 14d of pumping head 14, whereas the driving chamber 12d of pumping head 12 is connected to drain 35 via ports 24b and 24d. Thus, a driving force will now be applied to diaphragm 18 of pumping head 14 to move it rightwardly, thereby causing its pumping chamber 14p to feed the fertilizer therein via suction/delivery valve assembly 30 to the feed line 73, whereas pumping chamber 12p in pumping head 12 is expanded to draw into it fertilizer from its tank 4 via suction/delivery valve assembly 28.

FIG. 1a illustrates a variation in the pump of FIG. 1, wherein the differential pressure between the upstream and downstream sides of the pump is effected by the provision of a reducing valve 80, rather than by the use of the booster pump 74 in FIG. 1. Another variation illustrated in FIG. 1a is the use of both pumping heads 12, 14 for pumping fertilizer solution from a single tank 4, rather than from the two tanks 4 and 6 in FIG. 1; thus, in FIG. 1a tank 6 and its feed line 73 are omitted, both pumping heads being effective to pump the fertilizer solution from the single tank 4 via its feed line 72.

FIG. 6 illustrates the manner of connecting the pump of FIG. 1 (and FIG. 1a) to produce a single-action pumping operation, in which case no differential pressure in the line between the upstream and downstream sides of the pump is necessary. Accordingly, the single-action pumping arrangement illustrated in FIG. 6 does not require the booster pump 74 of FIG. 1, nor the reducing valve 80 of FIG. 1a. In addition, the pump uses only one tank 104 for the fertilizer and only one feed-delivery valve, 130. In this operation, one of the pumping heads (head 114) would be connected as described with respect to the double-action operation of FIG. 1, namely with its driving chamber 114d connected to port 124c of the main valve 124, and its pumping chamber connected to the feed-delivery valve 130. However, in the other pumping head 112, its driving chamber 112d is also connected, as a driving chamber as before, to port 124b of main valve 124, but to its other chamber, used as a pumping chamber, by connecting it to port 124c of the main valve 124; accordingly, this latter chamber is designated as a driving chamber 112d', rather than as a pumping chamber as in FIG. 1.

It will thus be seen that during the leftward stroke of the pump illustrated in FIG. 6, the driving chamber 112d is connected to the supply line so as to move its diaphragm leftwardly, whereas driving chamber 114d in pumping head 114 is connected to drain. During this leftward stroke, pumping chamber 114p draws fertilizer solution from tank 104, but chamber 112d' (corresponding to pumping chamber 12p in FIG. 1) does not contain nor inject any fertilizer solution, but is merely connected to drain via port 124c of the main valve 124. At the end of the leftward stroke, however, the reversal of the connections by the pilot valve 126 causes port 124c of the main valve 124 to be connected to the pressurized supply line 102, whereupon both chambers 112d' and 114d of the two pumping heads 112 and 114 are now pressurized, thereby moving their diaphragms rightwardly to cause the fertilizer within pumping chamber 114p to be injected via suction/delivery valve assembly 130 and feed line 172 into the water supply line 102, while the water within chamber 112d is fed to drain.

In all other respects, the construction and operation of the single-action arrangement of FIG. 6 are the same as described above with respect to the double-action set-up of FIGS. 1–5.

It will be appreciated that the water fertilizer ratio is 1:1 in that the double-action arrangement of FIGS. 1 and 1a, and 3:1 in the single-action arrangement of FIG. 6. However, pumping head 112 in the FIG. 6 arrangement could be of smaller size than pumping head 114; thus, if the cross-sectional area of pumping head 112 is one-half of that of pumping head 114, the water:fertilizer ratio will be 2:1. Also, the differential-pressure required for the double-action pumping operation of FIGS. 1 and 1a could be obtained in other ways, e.g., by the pressure drop across a filter.

Many other variations, modifications and applications of the illustrated embodiments of the invention will be apparent.

What is claimed is:

1. A fluid-driven reciprocating pump comprising:

a pair of pumping heads each containing a displaceable member defining a driving chamber and a pumping chamber on opposite sides thereof;

a mechanical connection coupling the two displaceable members for reciprocating together;

means including a main valve and a pilot valve for connecting the driving chamber of at least one of said pumping heads to a source of pressurized fluid and the pumping chamber of said one pumping head to a source of material to be pumped;

and means including said main valve and said pilot valve for connecting the driving chamber of the other pumping head to a source of pressurized fluid;

said main valve including a cylinder, a stem movable in said cylinder, a pair of pistons fixed to said movable stem, a plurality of ports controlled by said pistons, and a diaphragm connected to one end of said stem and closing one end of said cylinder to define a fluid control chamber therein;

said pilot valve including a stem reciprocable by said mechanical connection such that in one position of said two displaceable members the pilot valve applies the source of pressurized fluid to said control chamber of the main valve to move said main valve stem in the direction to connect the driving chamber of one pumping head to the source of pressurized fluid, whereas in the opposite position of said two displaceable members the pilot valve interrupts the application of the source of pressurized fluid to said control chamber of the main valve;

one of said pistons of the main valve having a larger cross-sectional area exposed to the source of pressurized fluid than the other piston of said main valve, such as to move said main valve stem in the opposite direction, to connect the driving chamber of the other pumping head to the source of pressurized fluid, when the pilot valve interrupts the application of the pressurized fluid to said control chamber of the main valve.

2. The pump according to claim 1, wherein the driving chamber of said other pumping head is connected to the source of pressurized fluid, and the pumping chamber of said other pumping head is connected to another source of material to be pumped, thereby providing a double-action pumping operation capable of pumping the same or different materials from two different sources.

3. The pump according to claim 1, wherein each of said displaceable members is a diaphragm and are coupled for reciprocation together by a connecting rod.

4. The pump according to claim 1, wherein the source of pressurized fluid is a liquid supply line, and the outlets of the pumping chambers of the two pumping heads are connected to said liquid supply line downstream of the reciprocating pump for injecting said material into the supply line.

5. The pump according to claim 4, wherein said liquid supply line includes a reducing valve between the inlet to the reciprocating pump, and the outlet thereof to the supply line.

6. The pump according to claim 4, further including an externally-powered booster pump for boosting the pressure of the liquid from the supply line before applied to the driving chambers of the two pumping heads.

7. The pump according to claim 4, further including a presettable regulating valve between the supply line and the driving chamber of the two pumping heads for presetting the period of each reciprocating stroke.

8. The pump according to claim 4, further including presettable members on said connecting rod between the two diaphragms for presetting the magnitude of each reciprocation stroke.

9. The pump according to claim 8, wherein said presettable members are actuator elements carried by said connecting rod and presettable at predetermined distances away from a pilot valve therebetween, which actuator elements actuate the pilot valve to terminate the respective reciprocation stroke and to start the next stroke.

10. The pump according to claim 9, wherein said pair of actuator elements are movable together by a threaded pin attached to said connecting rod towards or away from the pilot valve therebetween.

11. A reciprocating pump for injecting a fertilizer into the water of a pressurized water supply line, comprising:

a pair of pumping heads each containing a displaceable member defining a driving chamber and a pumping chamber on opposite sides thereof;

a mechanical connection coupling the two displaceable members for reciprocation together;

means including a main valve and a pilot valve for connecting the driving chamber of at least one of said pumping heads to the pressurized water supply line and the pumping chamber of said one pumping head to a first source of fertilizer to be pumped;

and means including said main valve and said pilot valve for connecting the driving chamber of the other pumping head to the pressurized water supply line;

said main valve including a cylinder, a stem movable in said cylinder, a pair of pistons fixed to said movable stem, a plurality of ports controlled by said pistons, and a diaphragm connected to one end of said stem and closing one end of said cylinder to define a fluid control chamber therein;

said pilot valve including a stem reciprocable by said mechanical connection such that in one position of said two displaceable members the pilot valve applies the source of pressurized fluid to said control chamber of the main valve to move said main valve stem in the direction to connect the driving chamber of one pumping head to the source of pressurized fluid, whereas in the opposite position of said two displaceable members the pilot valve interrupts the application of the source of pressurized fluid to said control chamber of the main valve;

one of said pistons of the main valve having a larger cross-sectional area exposed to the source of pressurized fluid than the other piston of said main valve, such as to move said main valve stem in the opposite direction, to connect the driving chamber of the other pumping head to the source of pressurized fluid, when the pilot valve interrupts the application of the pressurized fluid to said control chamber of the main valve.

12. The pump according to claim 11, wherein said pressurized water supply line includes a reducing valve between the inlet to the reciprocating pump, and its outlet to the supply line.

13. The pump according to claim 11, further including an externally-powered booster pump for boosting the pressure of the liquid from the water supply line before applied to the driving chambers of the two pumping heads.

14. The pump according to claim 11, further including a presettable regulating valve between the water supply line and the driving chamber of the two pumping heads for presetting the period of each reciprocating stroke.

15. The pump according to claim 11, wherein said displaceable members are diaphragms and are coupled for reciprocation together by a connecting rod.

16. The pump according to claim 15, further including presettable members on said connecting rod between the two diaphragms for presetting the magnitude of each reciprocation stroke.

17. The pump according to claim 16, wherein said presettable members are actuator elements carried by said connecting rod and presettable at predetermined distances away from a pilot valve therebetween, which actuator elements actuate the pilot valve to terminate the respective reciprocation stroke and to start the next stroke.

* * * * *